(12) United States Patent
Liu et al.

(10) Patent No.: US 8,784,029 B2
(45) Date of Patent: Jul. 22, 2014

(54) INSERTION TYPE FURNITURE CONNECTOR

(75) Inventors: Minsheng Liu, Dongguan (CN); Yuqi Liu, Dongguan (CN)

(73) Assignees: Lei Cao, Dongguan, Guangdong (CN); Jie Liu, Dongguan, Guangdong (CN); Minsheng Liu, Dongguan, Guangdong (CN); Yuqi Liu, Dongguan, Guangdong (CN)

( * ) Notice: Subject to any disclaimer, the term of this patent is extended or adjusted under 35 U.S.C. 154(b) by 286 days.

(21) Appl. No.: 13/320,240

(22) PCT Filed: May 11, 2010

(86) PCT No.: PCT/CN2010/072619
§ 371 (c)(1),
(2), (4) Date: Nov. 11, 2011

(87) PCT Pub. No.: WO2010/130194
PCT Pub. Date: Nov. 18, 2010

(65) Prior Publication Data
US 2012/0054992 A1 Mar. 8, 2012

(30) Foreign Application Priority Data

May 12, 2009 (CN) .................. 2009 2 0056374 U
Sep. 8, 2009 (CN) .................. 2009 2 0194261 U

(51) Int. Cl.
*F16B 13/06* (2006.01)

(52) U.S. Cl.
USPC .............................. 411/508; 411/45; 403/231

(58) Field of Classification Search
USPC .......... 411/508–510, 21, 45, 46, 48, 57.1, 71, 411/80.5; 403/294, 231, 316, 355, 388, 403/DIG. 13; 52/582.2, 584.1, 592.1
See application file for complete search history.

(56) References Cited

U.S. PATENT DOCUMENTS

| | | | | |
|---|---|---|---|---|
| 5,902,083 A | * | 5/1999 | Hwang | 411/48 |
| 6,048,147 A | * | 4/2000 | Arisaka et al. | 411/48 |
| 6,454,503 B1 | * | 9/2002 | Polic et al. | 411/45 |
| 7,001,128 B2 | * | 2/2006 | Kuntze | 411/508 |
| 7,083,370 B2 | * | 8/2006 | Vallance | 411/45 |
| 7,413,367 B2 | * | 8/2008 | Hawang | 403/297 |
| 7,837,408 B2 | * | 11/2010 | Hawang | 403/408.1 |

* cited by examiner

*Primary Examiner* — Gary Estremsky
(74) *Attorney, Agent, or Firm* — Shimokaji & Associates P.C.

(57) ABSTRACT

The present invention relates to a furniture connector, in particular, to an insertion type furniture connector that includes a female buckle, a middle buckle and a sub-buckle. The female buckle is a hollow cylinder whose inner wall is formed with a positioning ring. The middle buckle is a hollow rod having an insertion hole in its axis direction, the rod wall of the front end portion of the middle buckle is provided with axis direction slits, and the exterior rim of the front end portion of the middle buckle engages with the inner wall of the female buckle having the positioning ring. The sub-buckle is a rod-shaped body which can be inserted into the insertion hole and which has a diameter matching with that of the insertion hole. Furniture panel can be connected by inserting the middle buckle into the female buckle and inserting the sub-buckle into the middle buckle without using a tool, facilitating the assembly of the furniture. The connection of the connector is stable due to the positioning of the middle buckle by the positioning ring.

19 Claims, 12 Drawing Sheets

INSERTION TYPE FURNITURE CONNECTOR

FIELD OF THE INVENTION

The present invention relates to a furniture connector, in particular, to an insertion type furniture connector.

BACKGROUND OF THE INVENTION

In convention board-like furniture, the following methods are mainly used to fix two vertical furniture parts:

1. Each of the furniture parts is connected together by using wood screw or rail, in this method the products are totally fixedly connected, which is not easily operated for user. Only the user who commands some assembling and operating skills can assembly well and the assembling furniture is not easily disassemble. If the product is assembled at workplace, the dimension of the package of the product will very large, which will not convenient for transportation and increase the transportation cost.

2. Each of the furniture parts is connected together by two in one plastic connectors. In the method, the connector protrudes out of the panel surface, which effects beauty in view and the user must assemble by using auxiliary tools, it is not easily operated and the connection of the furniture parts will easily produce space and not easily be disassembled.

SUMMARY OF THE INVENTION

The object of the present invention is to overcome the disadvantage of the present technology and provide an insertion type furniture connector which can rapidly be installed without using a tool, the insertion type furniture connector is stably connected.

Another object of the present invention is to provide an insertion and extrusion type furniture connector.

The present invention is also provides a panel assembly.

In order to achieve the above objects, the technical schemes in the present invention are as follows:

An insertion type furniture connector, which contains a female buckle, a middle buckle and a sub-buckle; the female buckle is a hollow cylinder whose inner wall is formed with a positioning ring; the middle buckle is a hollow rod having an insertion hole in its axis direction, the rod wall of the front end portion of the middle buckle is provided with axis direction slits; and the exterior rim of the front end portion of the middle buckle engages with the inner wall of the female buckle having the positioning ring; the sub-buckle is a rod-shaped body which can be inserted into the insertion hole and which has a diameter matching with that of the insertion hole.

The further technical schemes in the present invention include the follows: The rear end portion of the middle buckle is provided with a boss extended along its radial direction.

The rear end portion of the sub-buckle has step-shaped bottom panel, the front face of the bottom panel is matched with the rear face of the boss.

The outer margin of the boss has protective wall backward, the height of the protective wall is not less than the thickness of the bottom panel.

The front end portion of the middle buckle is provided with a guide part which is extended axially forward and has a gradually decreasing outer diameter.

The front end portion of the sub-buckle is provided with a guide part which is extended axially forward and has a gradually decreasing diameter.

The outer wall of the female buckle has pawls.

The rear end portion of the female buckle has raised position-limit steps along its axis.

The rear end portion of the sub-buckle is engraved with occlusal strias.

The positioning ring is convex towards the axis of the female buckle and is formed with convex annular shape, which has ladder-shaped sections with two beveled edges.

An insertion and extrusion type furniture connector contains a female buckle, a middle buckle and a sub-buckle; the female buckle has a buckle hole, whose wall is formed with a positioning ring; the middle buckle is a hollow rod having an insertion hole in its axis direction, the rod wall of the front end portion of the middle buckle is provided with axis direction slits, and the front end portion of the middle buckle has an exterior rim engaged with the buckle hole; the sub-buckle is a rod-shaped body which is inserted into the insertion hole and which has a diameter matching with that of the insertion hole.

The further technical schemes in the present invention includes the follows: the female buckle is cylinder-shaped, and the female buckle has a central axis perpendicular to that of the buckle hole and provide a plane perpendicular to the central axis of the buckle hole in the position of opposing the middle buckle.

The top surface of the female buckle is a flat surface, where has a concave adjusting groove. The rear end portion of the middle buckle is provided with a boss extended along its radial direction.

The rear end portion of the sub-buckle has step-shaped bottom panel, the front face of the bottom panel is matched with the rear face of the boss.

The exterior rim of the boss has protective wall backward, and the height of the protective wall is no less than the thickness of the bottom panel.

The front end portion of the middle buckle is provided with a guide part which is extended axially forward and has a gradually decreasing outer diameter.

The front end portion of the sub-buckle is provided with a guide part which is extended axially forward and has a gradually decreasing diameter.

According the above, the rear part of the sub-buckle is engraved with occlusal strias.

Further, the outer wall of the female buckle has pawls.

A panel assembly contains a first panel having a first mounting hole, a second panel having a second mounting hole, and an insertion type furniture connector for connecting the first panel and the second panel; the insertion type furniture connector contains a female buckle, a middle buckle and a sub-buckle;

the female buckle is inserted into the first mounting hole on the first panel, and the female buckle has a buckle hole, whose wall is formed with a positioning ring;

the middle buckle is a hollow, rod having an insertion hole in its axis direction, the rod wall of the front end portion of the middle buckle is provided with axis direction slits, the front end portion of the middle buckle runs through the second mounting hole on the second panel and enters into the buckle hole of the female buckle, and the front end portion of the middle buckle has an exterior rim engaged with the wall of the buckle hole having the positioning ring;

the sub-buckle is a rod-shaped body, which is inserted into the insertion hole of the middle buckle, and which has a diameter matching with that of the insertion hole.

The female buckle is provided with a sealing cover to seal the buckle hole on its inserting end portion where it is inserted into the bottom of the mounting hole.

The side where the rear face of the female buckle that lies in the side of the orifice of the mounting hole is flush with the surface of the first panel.

The distance between the rear face of the female buckle and the rear face of the middle buckle is equal to the thickness of the second panel.

The rear end portion of the middle buckle has a boss extended along its radial direction, the second panel has a recess cut on the side where the rear end portion of the middle buckle lies, the boss is held in the recess cut.

The outer wall of the sub-buckle, which part is inserted into the middle buckle, has bumps.

The outer wall of the middle buckle has protruding portions.

The outer wall of the female buckle has pawls.

The advantages of the present invention are as follows: in the invention, the female buckle is installed in the mounting hole of the panel; the middle buckle runs through the second panel. During assembly, the middle buckle is inserted into the female buckle, when the middle buckle passes through the positioning ring, because the front end portion of the middle buckle is provided with slits, the front end portion of the middle buckle is radial shrinkage so as to smoothly insert into the female buckle. After the front end portion of the middle buckle is inserted into the female buckle, the second panel is connected with the panel, then inserting the sub-buckle from the rear end portion of the insertion hole of the middle buckle, after the sub-buckle is completely inserted into the insertion hole, that is to say, crowding the insertion hole, the front end portion of the middle buckle can not be radial shrinkage, thereby the outer wall of the middle buckle is matched with the inner wall of the female buckle, the middle buckle is limited by the positioning ring and can not take off from the female buckle, then the furniture panels are connected stably. Furniture panels can be connected by inserting the middle buckle into the female buckle and inserting the sub-buckle into the middle buckle without using a tool, facilitating the assembly of the furniture. The connection of the connector is stable due to the positioning of the middle buckle by the positioning ring.

DESCRIPTION OF THE DRAWINGS

The invention is further explained with the drawing as follows, but the embodiments in the drawings are not means any limit to the present invention.

Figure 1:
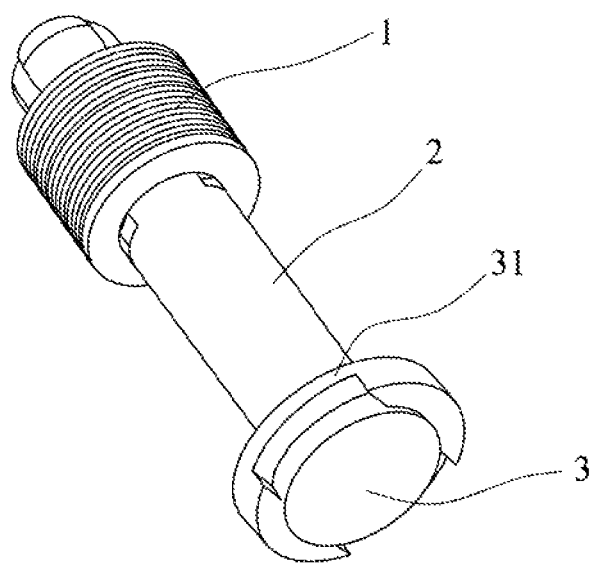
FIG. 1 is a perspective view of the insertion type furniture connector according to the invention.

From FIG. 1 to FIG. 13 including:

Female buckle 1, pawls 11, the side face 112; the top face 115, the rear face 116, the position-limit steps 12, the positioning ring 13, the bias 131, the buckle hole 14, the adjusting groove 16, the position-limit steps 17, the sealing cover 18, the middle buckle 12, the insertion hole 21, the front end portion 22, the slits 221, the boss 23, the protective wall 231, the guide part of the middle buckle 24, the sub-buckle 3, the bottom panel-31, the guide part of the sub-buckle 32, the occlusal strias 33, the bumps 34, the protruding portions 35, the first panel 4, the mounting hole 41, the second panel 4, the recess cut 51.

DETAILED DESCRIPTION OF ILLUSTRATED EMBODIMENTS

The invention is further explained with drawing as follows. Referring to FIG. 1, FIG. 2, FIG. 3, FIG. 4 and FIG. 5, there drawings show the preferred embodiments in the present invention. An insertion type furniture connector, which contains a female buckle 1, a middle buckle 2 and a sub-buckle 3; the female buckle 1 is a hollow cylinder whose inner wall is formed with a positioning ring 13; the middle buckle 2 is a hollow rod having an insertion hole 21 in its axis direction, the rod wall of the front end portion 22 of the middle buckle 2 is provided with axis direction slits 221, and the exterior rim of the front end portion 22 of the middle buckle 2 engages with the inner wall of the female buckle 2 having the positioning ring 13; the sub-buckle 3 is a rod-shaped body which can be inserted into the insertion hole 21 and which has a diameter matching with that of the insertion hole 21.

The present invention mainly suits for connecting the furniture panels, in using, the female buckle 1 is installed into the mounting hole that presets in the first panel, the rear end portion of the female buckle 1 is flush with the surface of the panel; the middle buckle 2 runs through the second panel, that is to say, the front end portion 22 of the middle buckle 2 protrudes the second panel, that is the side where the second panel contacts with the first panel, while the rear end portion of the middle buckle 2 exposes the back face of the first panel, in the practical application process, the rear face of the middle 2 is not beyond the back face of the second panel.

Figure 3:
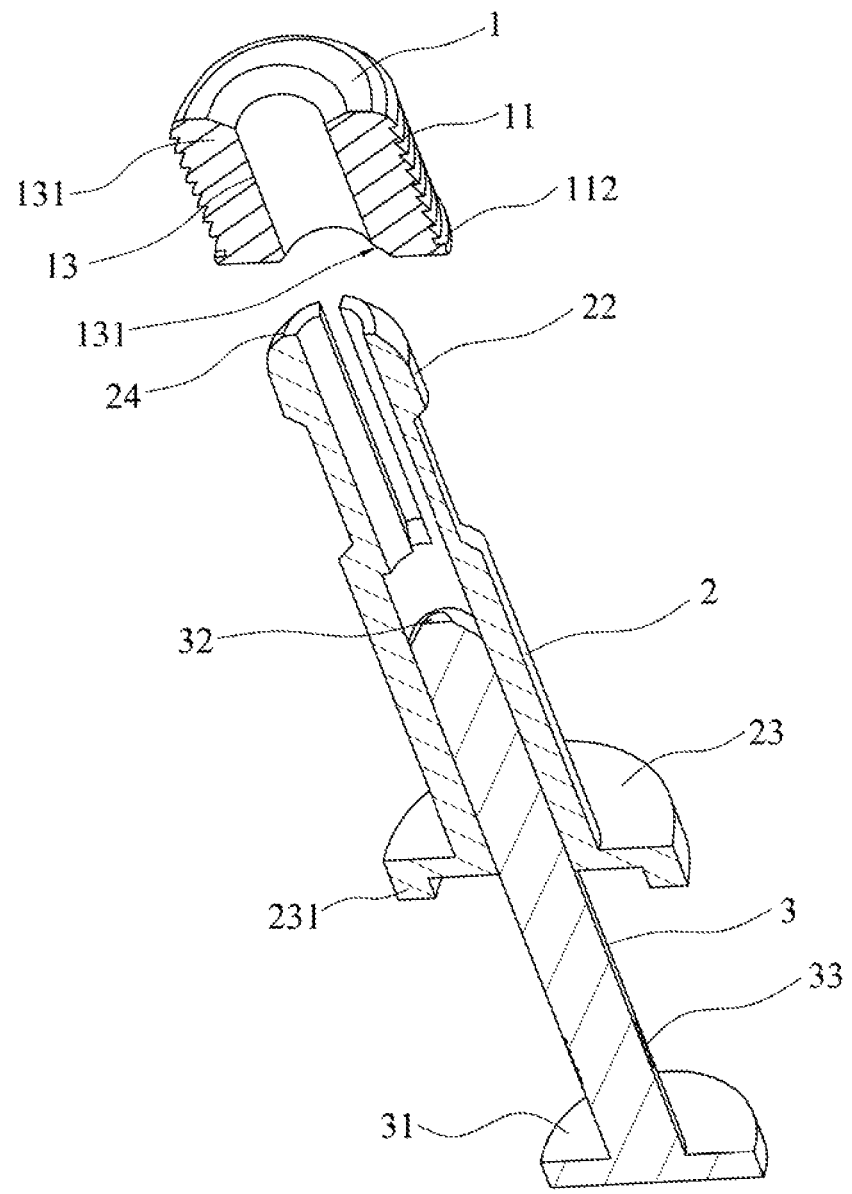
FIG. 3 is a cross-sectional perspective view of the insertion type furniture connector according to the invention.
Figure 4:
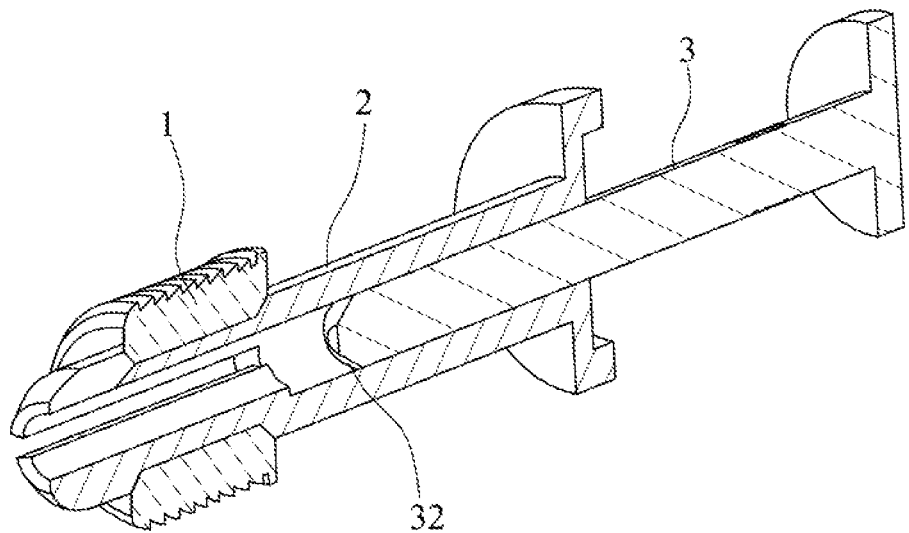
FIG. 4 is a cross-sectional perspective view in using state of the insertion type furniture connector according to the invention that the middle buckle is inserted into the female buckle, the sub-buckle is inserted into the middle buckle.
Figure 5:
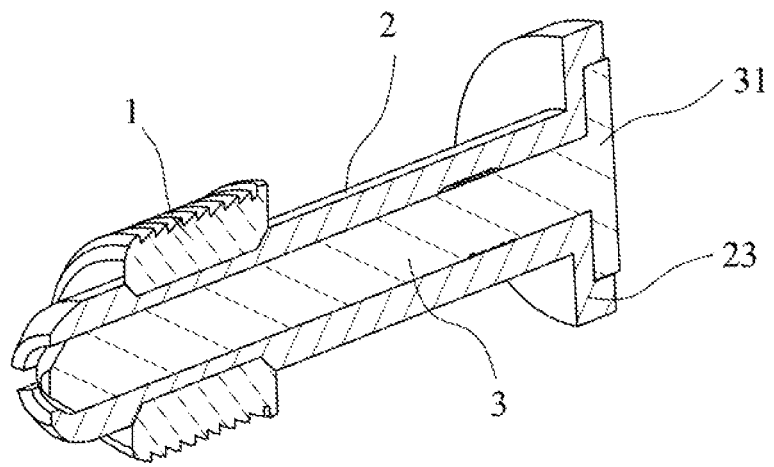
FIG. 5 is a cross-sectional perspective view of illustrating a practical application of the insertion type furniture connector according to the invention.

Referring FIG. 3, FIG. 4, FIG. 5, during assembly, the middle buckle 2 is inserted into the female buckle 1, when the middle buckle 2 passes through the positioning ring 13, because the front end portion 22 of the middle buckle 2 is provided with slits 221, the front end portion 22 of the middle buckle 2 is radial shrinkage so as to smoothly insert into the female buckle 1. After the front end portion 22 of the middle buckle 2 is inserted into the female buckle 1, the front face of the second panel is connected with the first panel, as then result the second panel is connected together with the first panel. Then the sub-buckle 3 is inserted into the middle buckle 2 from the rear end portion of the insertion hole 21, after the sub-buckle 3 is completely inserted into the insertion hole 21, that is to say, crowding the insertion hole 21, the front end portion 22 of the middle buckle 2 can not be radial shrinkage, thereby the outer wall of the middle buckle 2 is matched with the inner wall of the female buckle 1, the middle buckle 2 is limited by the positioning ring 12 and can not take off from the female buckle 1, then the furniture panels is connected stably. And, the distance from the rear face of the middle buckle 2 to the rear face of the female buckle 1 is equal to the thickness of the second panel that is going to install, therefore, for achieving that the second panel that is going to install can be tightly fasten to the first panel, the length of the middle buckle 2 and that of the sub-buckle 3 should promise that after the middle 2 is inserted into the female buckle 1, the distance from the rear face of the middle buckle 2 to the rear face of the female buckle 1 is matched with the thickness of the second panel that is going to install. When it is need to assembly the different thickness second panel, it is only need to change the middle buckle 2 and sub-buckle 2 with different length.

And, the female buckle 1 and the middle buckle 2 is made from high-pressure and toughness plastic materials, while the sub-buckle 3 is made from rigid metal materials. Thus, the female buckle 1 and the middle buckle 2 can smoothly be installed into furniture panels, and the middle buckle 2 can be smoothly inserted into the female buckle 1. The rigid sub-buckle 3 is promised that after the sub-buckle 3 is inserted into the middle buckle 2, effectively constricting the front end portion 22 of the middle 2 to be radial shrinkage.

Figure 2:
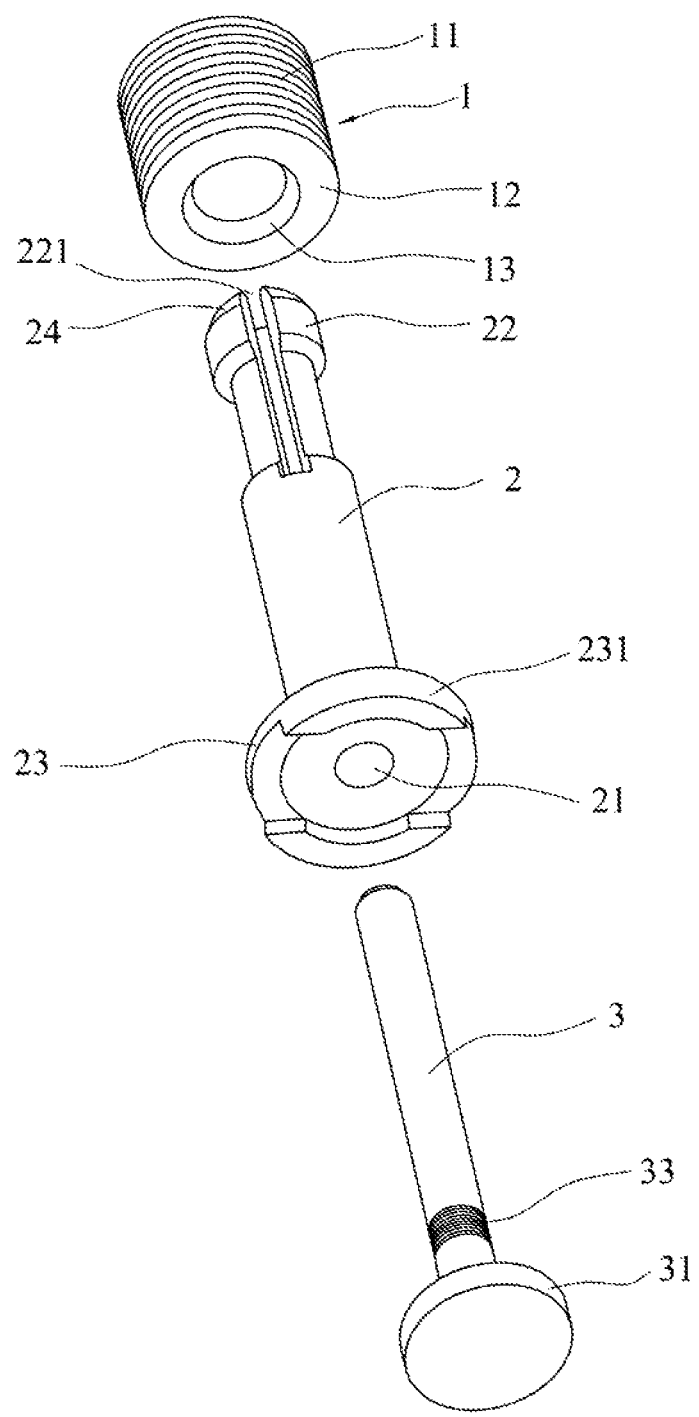
FIG. 2 is an exploded view of the insertion type furniture connector according to the invention.

Referring FIG. 1 and FIG. 2, in the embodiment, the rear end portion of the middle buckle 2 is provided with a boss extended along its radial direction.

The rear end portion of the sub-buckle 3 has step-shaped bottom panel 31, the front face of the bottom panel 31 is matched with the rear face of the boss.

The boss 23 mainly has location function, used for obviating the middle buckle 2 sliding forward along axial direction. During assembly, the back face of the second panel has a retaining nest matching with the boss 23, the front face of the boss 23 is corresponding with the bottom of the retaining nest, thereby the boss 23 is restricted by the bottom of the retaining nest, as a result the middle buckle 2 can not move forward, so increasing the operational reliability of the furniture connector in the invention. Similarly, the front face of the step-shaped bottom panel 31 of the sub-buckle 3 is matched with the back face of the boss 23, thereby the bottom panel 31 is restricted by the back face of the boss 23, as a result the sub-buckle 3 can not slide forward after assembling. Both of the boss 23 and the bottom panel 31 have location function.

Referring FIG. 2 and FIG. 3, in the embodiment, the exterior rim of the boss 23 has protective wall 231 backward, the height of the protective wall 231 is no less than the thickness of the bottom panel 31, so the boss 23 and the protective wall 231 protect the sub-buckle 3 together, avoiding the rigid sub-buckle 2 directly contact and collide the furniture panels.

Referring FIG. 3, in the embodiment, the front end portion of the middle buckle 24 is provided with a guide part 24 which is extended axially forward and has a gradually decreasing outer diameter. Because the diameter of the front end portion of the guide section 24 of the middle buckle is less than that of the rear end portion, also less than the inner diameter of the rear end portion of the female buckle 1, when the middle buckle 2 is inserted into the female buckle 1, first the guide part 24 of the middle buckle is inserted into the female buckle 1, thereby the middle buckle 2 can smoothly be inserted into the female buckle, so increasing the assembly facility of the furniture connector in the invention.

Referring FIG. 4, in the embodiment, the front end portion of the sub-buckle 3 is provided with a guide part 32 which is extended axially forward and has a gradually decreasing diameter. The reason and the function of which is same as that of the guide part 24 of the middle buckle 2, the guide part 32 of the sub-buckle results that the sub-buckle 3 can smoothly be inserted into the insertion hole 21, so increasing the assembly facility of the furniture connector in the invention.

Referring FIG. 2, in the embodiment the outer wall of the female buckle 1 is formed with pawls 11; the female buckle 1 in the invention is inserted into the mounting hole by press method. The pawls 11 increases the bite force of the female buckle and the furniture panel and avoids the female buckle 1 taking off from the mounting hole, so increasing the connecting reliability of the female buckle.

Referring FIG. 2 and FIG. 3, in the embodiment, the rear end portion of the female buckle 1 has raised position-limit steps 12 along its axis. The outer diameter of the position-limit step 12 is bigger than that of the female buckle, so the female buckle 1 is installed into the mounting hole of the panel, the back face of the position-limit step 12 is flush with the surface of the panel, while the female buckle can not be slide forward due to the position-limit step 12.

Referring FIG. 2 and FIG. 3, in the embodiment, the rear end portion of the sub-buckle 3 is engraved with occlusal strias 33, the occlusal strias 33 mainly increases the bite force between the exterior rim of the sub-buckle 3 and the interior rim of insertion hole 21, avoiding the sub-buckle 3 to take off from the insertion hole 21 of the middle buckle 2 during the application process, which further increases the operational reliability of the furniture connector in the invention. Of course, only if achieving the object of increasing the bite force between the exterior rim of the sub-buckle 3 and the interior rim of insertion hole 21, the occlusal strias 33 can be straight line, thread or any other shapes.

Referring FIG. 1 and FIG. 2, in the embodiment, the positioning ring 13 is convex towards the axis of the female buckle 1 and is formed with convex annular shape, which has ladder-shaped sections with two beveled edges. This shaped positioning ring 13 can effectively fasten the position of the middle buckle 2 in the female buckle 1, at the same time, during assembly process the middle buckle 2 is inserted into the female buckle 1, it can not be avoided that the insertion of the middle buckle 2 does not attain the right position, then when the sub-buckle 3 is inserted into the insertion hole 32, as the sub-buckle 3 is driven forward, the sub-buckle 3 will press the buckle wall of the middle buckle 2, then the middle buckle 2 is slide forward along the bias 131, this promises that the middle buckle 2 can be inserted and installed at the right position.

An insertion and extrusion type furniture connector contains a female buckle 1, a middle buckle 2 and a sub-buckle 3, the female buckle 1 has a buckle hole 14, and the hole wall of the buckle hole 14 is formed with a positioning ring 13; the middle buckle 2 is a hollow rod having an insertion hole 21 in its axis direction, the rod wall of the front end portion 22 of the middle buckle 2 is provided with axis direction slits 221, and the exterior rim of the front end portion 22 of the middle buckle 2 engages with the buckle hole 14; the sub-buckle 3 is a rod-shaped body which can be inserted into the insertion hole 21 and which has a diameter matching with that of the insertion hole 21.

Figure 6:
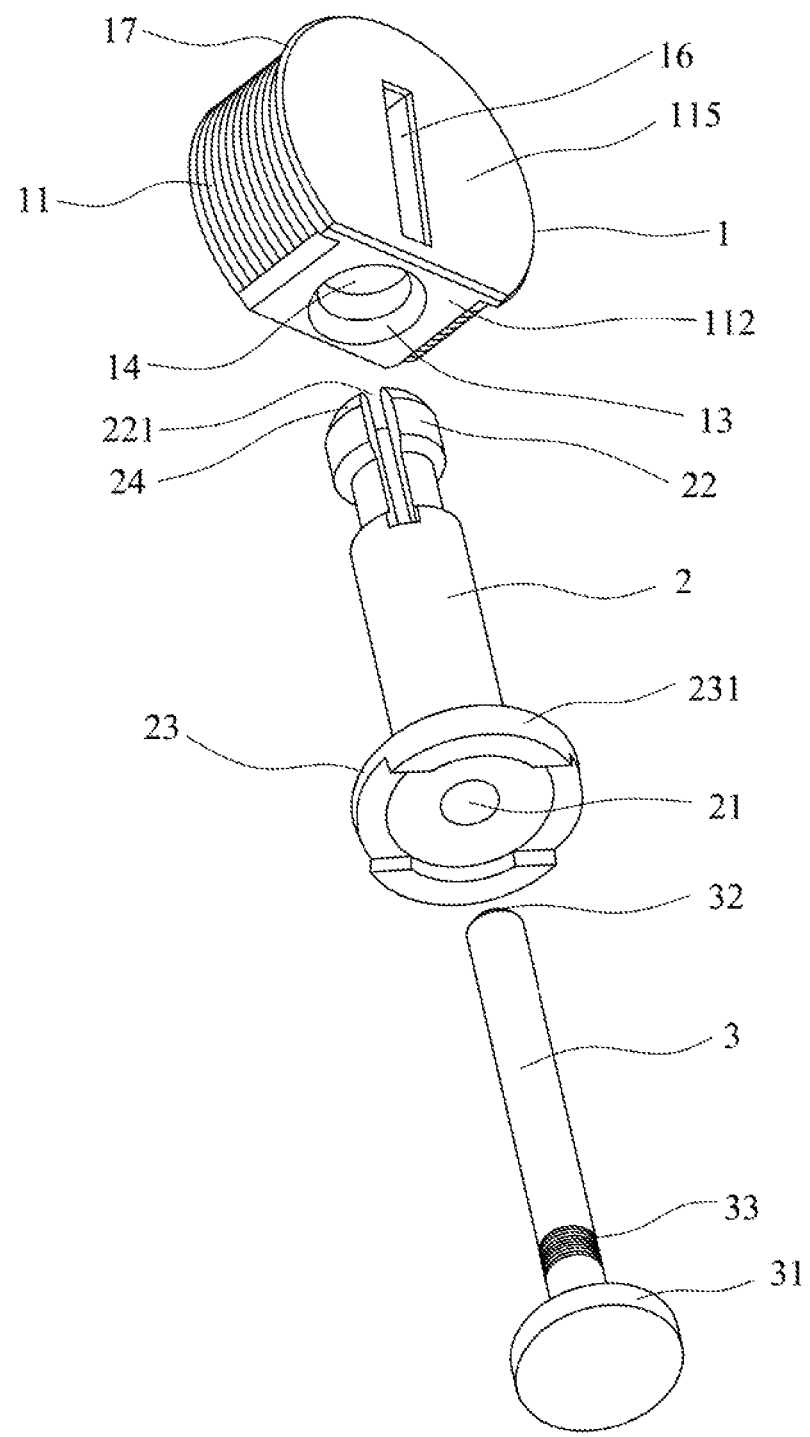
FIG. 6 is a perspective view of illustrating an unassembled state of the insertion and extrusion type furniture connector according to the invention.

Referring FIG. 6, the female buckle 1 is cylinder-shaped in a whole, which has a central axis perpendicular to that of the buckle hole 14, and which provides a plane perpendicular to the central axis of the buckle hole 14 in the position of opposing the sub-buckle 2, the plane is the side face 112 of the female buckle 1.

The furniture connectors in the present invention mainly suit for connecting furniture panels, take the connection of the first panel 4 and the second panel 5 for example, the female buckle 1 is embed installed at near the corner on the surface of the first panel 4, the top face 115 of the female buckle 1 is not surpass the top face of the first panel 4, the side face 12 of the female buckle 1 is not surpass the side face of the first panel 4, the buckle hole 14 opposites the middle buckle 2. the middle buckle 2 runs through the second panel, that is to say, the front end portion 22 of the middle buckle 2 protrudes the second panel, that is the side where the second panel contacts with the first panel, while the rear end portion of the middle buckle 2 exposes the back side of the first panel, in the practical application process, the rear face of the middle 2 is not beyond the back face of the second panel 5.

Figure 8:
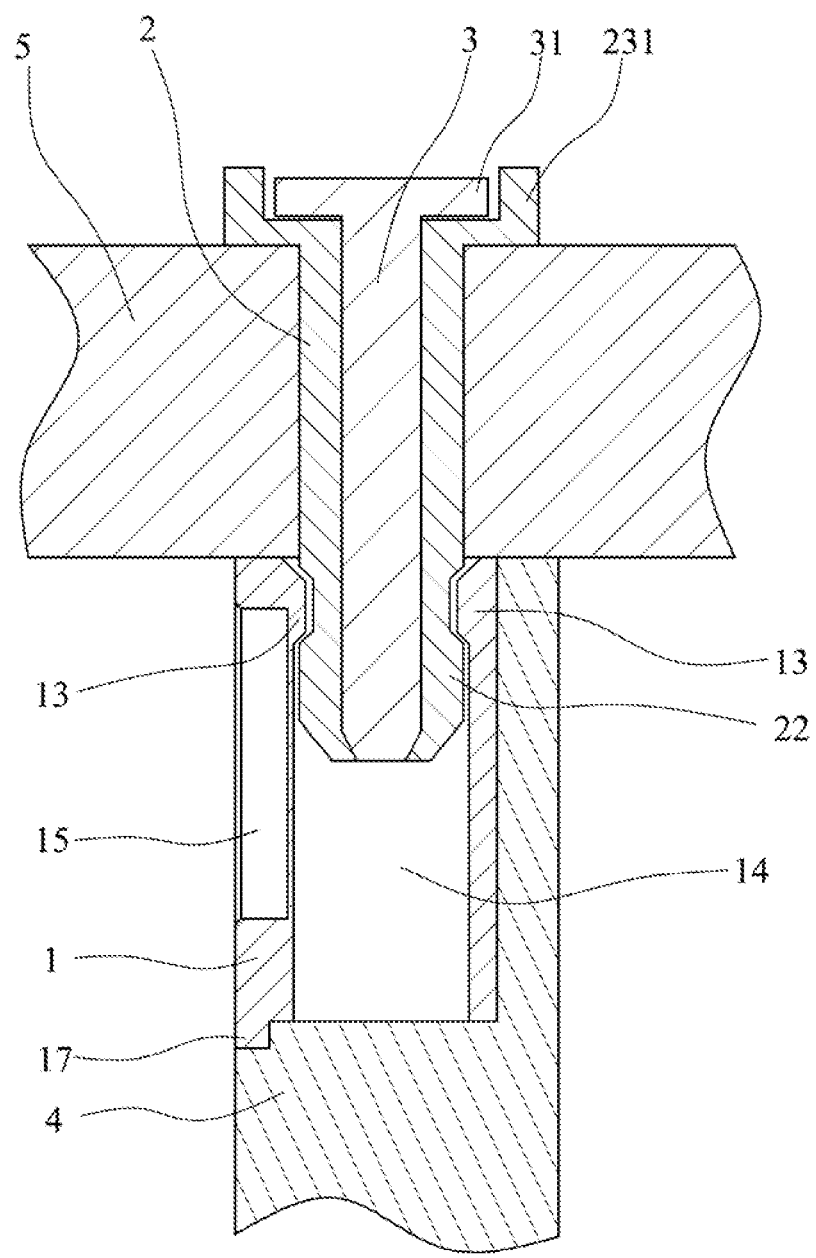
FIG. 8 is a assembling view of that the insertion and extrusion type furniture connector according to the invention is installed in the furniture parts.

Referring FIG. 6, FIG. 8, during assembly, the middle buckle 2 is inserted into the female buckle 1, when the middle buckle 2 passes through the positioning ring 13, because the front end portion 22 of the middle buckle 2 is provided with slits 221, the front end portion 22 of the middle buckle 2 is radial shrinkage so as to smoothly insert into the female buckle 1. After the front end portion 22 of the middle buckle 2 is inserted into the female buckle 1, the front face of the second panel 5 is connected with the first panel 4, then the second panel 5 is connected together with the first panel 4. Then the sub-buckle 3 is inserted into the middle buckle 2 from the rear end portion of the insertion hole 21, after the sub-buckle 3 is completely inserted into the insertion hole 21, that is to say, crowding the insertion hole 21, the front end portion 22 of the middle buckle 2 can not be radial shrinkage, thereby the outer wall of the middle buckle 2 is matched with the inner wall of the female buckle 1, the middle buckle 2 is limited by the positioning ring 12 and can not take off from the female buckle 1, then the furniture panels is connected stably. And, the distance from the rear face of the middle buckle 2 to the rear face of the female buckle 1 is equal to the thickness of the second panel 5 that is going to install, therefore, for achieving that the second panel 5 that is going to install can be tightly fasten to the first panel 4, the length of the middle buckle 2 and that of the sub-buckle 3 should promise that after the middle 2 is inserted into the female buckle 1, the distance from the rear face of the middle buckle 2 to the rear face of the female buckle 1 is matched with the thickness of the second panel 5 that is going to install. When it is need to assembly the different thickness second panel 5, it is only need to change the different length middle buckle 2 and sub-buckle 2.

And, the female buckle 1 and the middle buckle 2 is made from high-pressure and toughness plastic materials, while the sub-buckle 3 is made from rigid metal materials. Thus, the female buckle 1 and the middle buckle 2 can smoothly install into furniture panels, and the middle buckle 2 can be smoothly inserted into the female buckle 1. The rigid sub-buckle 3 is promised that after the sub-buckle 3 is inserted into the middle buckle 2, effectively constricting the front end portion 22 of the middle 2 the shrinkage to be radial shrinkage.

And, the top surface 115 of the female buckle 1 is a flat surface, and where has a concave adjusting groove 16. When the female buckle 1 is installed into the first panel 4, usually the buckle hole 14 incomplete opposites the middle buckle 2, a tool can be inserted into the adjusting groove 16, wiggle the female buckle to make the female buckle turning, thereby drive the buckle 14 to turn to opposite the middle buckle, this increases the assembly facility.

Figure 7:
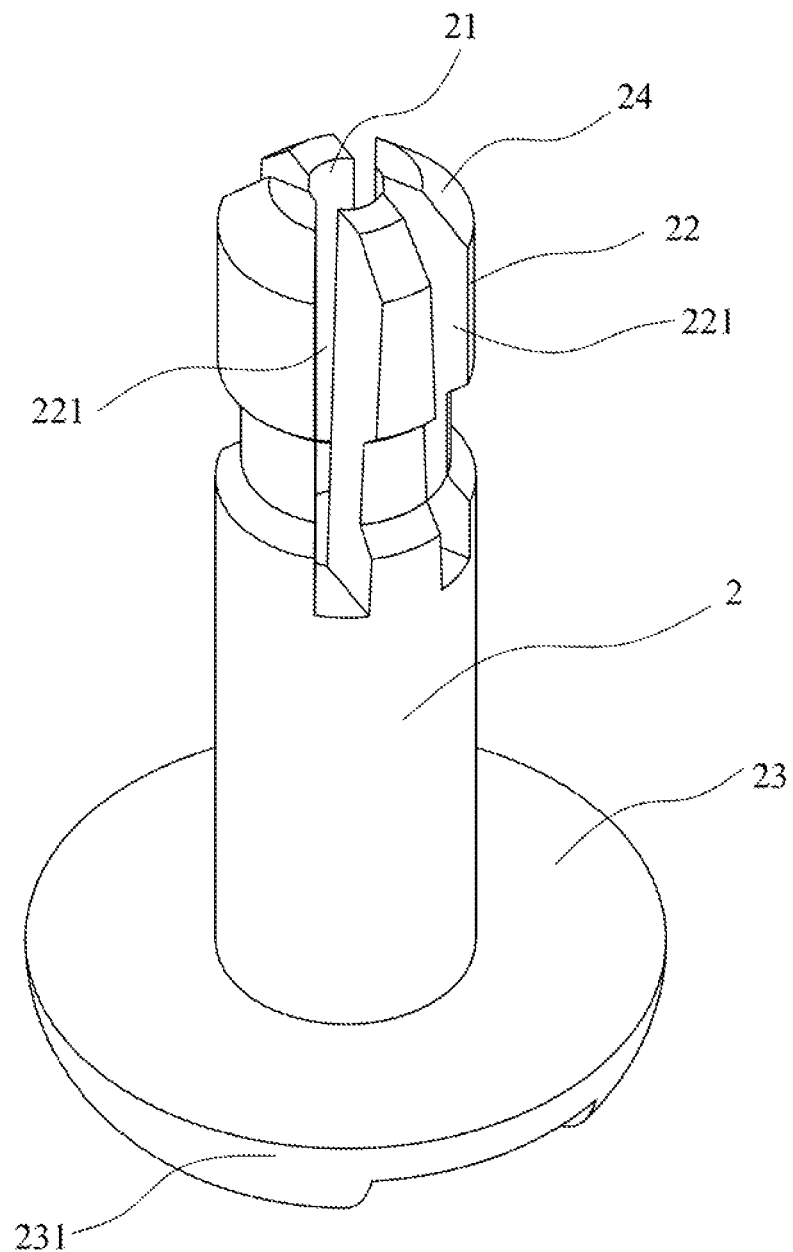
FIG. 7 is a perspective view of the middle buckle of the insertion and extrusion type furniture connector according to the invention.

Referring FIG. 6 and FIG. 7, in the embodiment, the rear end portion of the middle buckle 2 is provided with a boss 23 extended along its radial direction.

The rear end portion of the sub-buckle 3 has step-shaped bottom panel 31, the front face of the bottom panel 31 is matched with the rear face of the boss.

The boss 23 mainly has location function, used for obviating the middle buckle 2 sliding forward along axial direction. During assembly, the back face of the second panel has a retaining nest matching with the boss 23, the front face of the boss 23 is corresponding with the bottom of the retaining nest, thereby the boss 23 is restricted by the bottom of the retaining nest, as a result the middle buckle 2 can not move forward, so increasing the operational reliability of the furniture connector in the invention. Similarly, the front face of the step-shaped bottom panel 31 of the sub-buckle 3 is matched with the back face of the boss 23, thereby the bottom panel 31 is restricted by the back face of the boss 23. As a result the sub-buckle 3 can not slide forward after assembling. Both of the boss 23 and the bottom panel 31 have location function.

Referring FIG. 6 and FIG. 7, in the embodiment, the exterior rim of the boss 23 has protective wall 231 backward, the height of the protective wall 231 is no less than the thickness of the bottom panel 31, so the boss 23 and the protective wall 231 raised on the boss 23 protect the sub-buckle 3 together, avoiding the rigid sub-buckle 2 to directly contact and collide the furniture panels.

Referring FIG. 7, in the embodiment, the front end portion of the middle buckle 2 is provided with a guide part 24 which is extended axially forward and has a gradually decreasing outer diameter. Because the diameter of the front end portion of the guide part 24 of the middle buckle is less than that of the rear end portion, also less than the inner diameter of the rear end portion of the female buckle, when the middle buckle 2 is inserted into the female buckle 1, first the guide part 24 of the middle buckle is inserted into the female buckle 1, thereby the middle buckle 2 can smoothly be inserted into the female buckle, so increasing the assembly facility of the furniture connector in the invention.

Referring FIG. 6, in the embodiment, the front end portion of the middle buckle 3 is provided with a guide part 32 which is extended axially forward and has a gradually decreasing outer diameter. The reason and the function of which is same as that of the guide part 24 of the middle buckle 2, the guide part 32 of the sub-buckle results that the sub-buckle 3 can smoothly be inserted into the insertion hole 21, so increasing the assembly facility of the furniture connector in the invention.

Referring FIG. 6, FIG. 8, in the embodiment the outer wall of the female buckle 1 is formed with pawls 11, the female buckle 1 in the invention is inserted into the mounting hole by press method. The pawls 11 increases the bite force of the female buckle and the furniture panel and avoids the female buckle1 to take off from the mounting hole, so increasing the connecting reliability of the female buckle 1.

Referring FIG. 6 and FIG. 8, in the embodiment the rear part of the female buckle 1 has raised position-limit steps 17 along its axis. The outer diameter of the position-limit step 17 is bigger than that of the female buckle, so the female buckle 1 is installed into the mounting hole of the panel, the back face of the position-limit step 17 is flush with the surface of the panel, while the female buckle can not be slide forward due to the position-limit step 17.

Referring FIG. 6, in the embodiment, the rear end portion of the sub-buckle 3 is engraved with occlusal strias 33, the occlusal strias 33 mainly increases the bite force between the exterior rim of the sub-buckle 3 and the interior rim of insertion hole 21, avoiding the sub-buckle 3 to take off from the insertion hole 21 of the middle buckle 2 during the application process, which further increases the operational reliability of the furniture connector in the invention. Of course, only if achieving the object of increasing the bite force between the exterior rim of the sub-buckle 3 and the interior rim of insertion hole 21, the occlusal strias 33 can be straight line, thread or any other shapes.

Referring FIG. 6 and FIG. 7, in the embodiment, the positioning ring 13 is convex towards the axis of the female buckle 1 and is formed with convex annular shape, which has ladder-shaped sections with two beveled edges. This shaped positioning ring 13 can effectively fasten the position of the middle buckle 2 in the female buckle 1, at the same time, during assembly process the middle buckle 2 is inserted into the female buckle 1, it can not avoid that the insertion is not attain the right position, then when the sub-buckle 3 is inserted into the insertion hole 32, as the sub-buckle 3 is driven forward, the sub-buckle 3 will press the buckle wall of the middle buckle 2, then the middle buckle 2 is slide forward along the bias 131, this promises that the middle buckle 2 can inserted and installed the right position.

Figure 9:
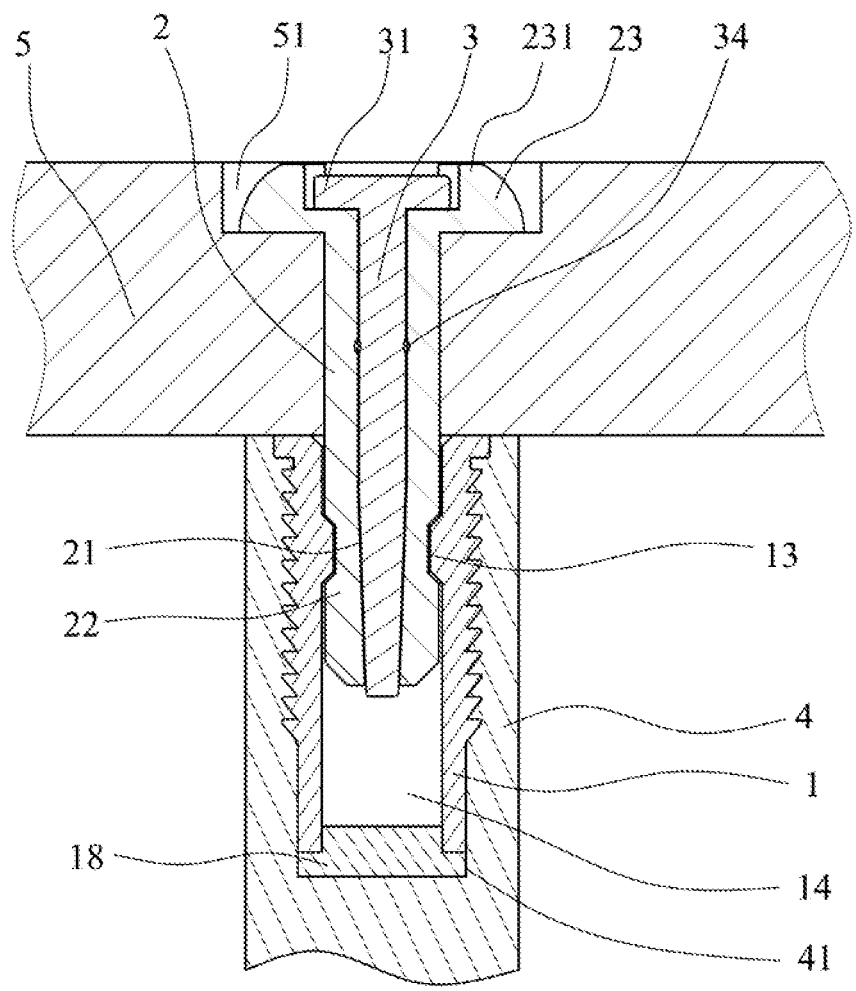
FIG. 9 is a perspective view of the first embodiment of the combine panel according to the invention.
Figure 10:
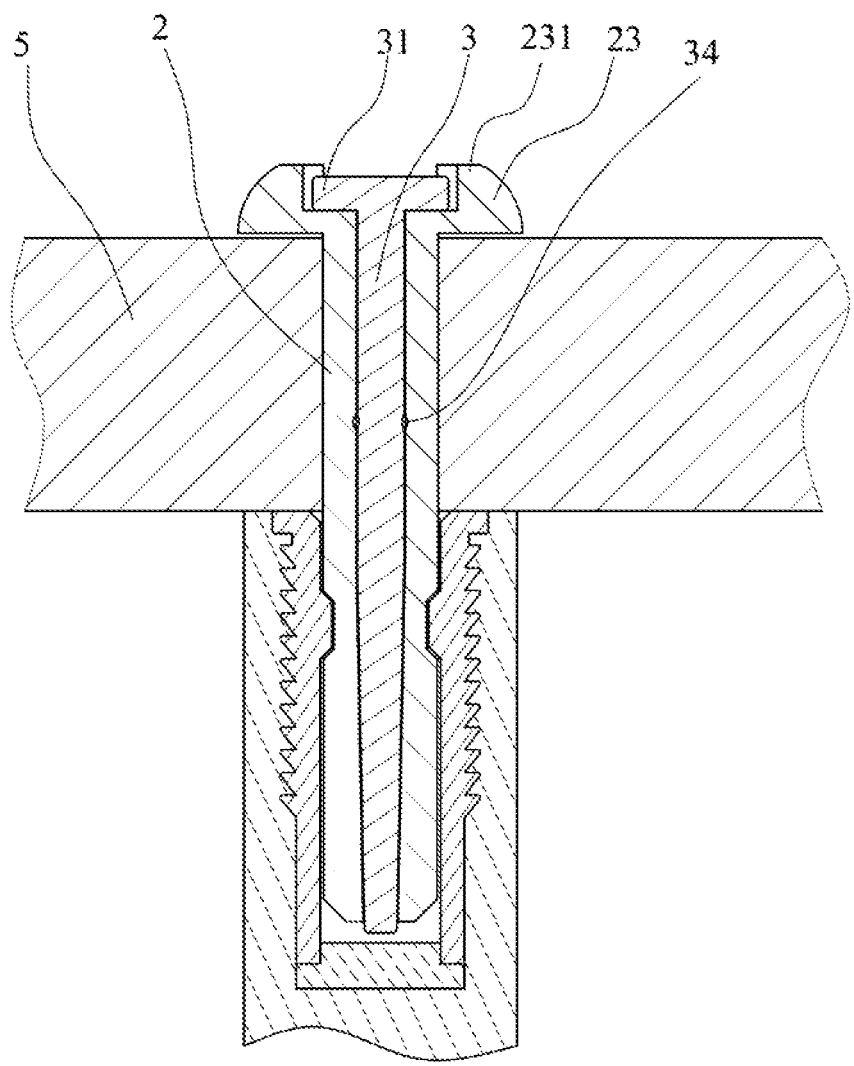
FIG. 10 is a perspective view of the second embodiment of the combine panel according to the invention.

Referring FIG. 9 and FIG. 10, a panel assembly contains a first panel 4, a second panel 5 and an insertion furniture connector connected the first panel 4 and the second panel 5; the insertion furniture connector contains a female buckle 1, a middle buckle 2 and a sub-buckle 3; the female buckle 1 has a buckle hole 14, and the hole wall of the buckle hole14 is formed with a positioning ring 13; the middle buckle 2 is a hollow rod having an insertion hole 21 in its axis direction, the rod wall of the front end portion 22 of the middle buckle 2 is provided with axis direction slits 221, and the exterior rim of the front end portion 22 of the middle buckle 2 engages with the buckle hole 14; the sub-buckle 3 is a rod-shaped body, which can be inserted into the insertion hole 21, and which has a diameter matching with that of the insertion hole 21. The first panel 4 has a first mounting hole 41; the female buckle 1 is inserted into the mounting hole 41 and engages with it; the rod wall of the front end portion 22 of the middle buckle 2 is inserted into the buckle hole 14 and when passes through the positioning ring 13, because the front end portion 22 of the middle buckle 2 is provided with slits 221, the front end portion 22 of the middle buckle 2 is radial shrinkage so as to smoothly insert into the female buckle 1. After the front end portion 22 of the middle buckle 2 is inserted into the female buckle 1, the part of which projected the female 1 runs through the second panel 4, thereby connecting the second panel and the first panel together; then, the sub-buckle 3 is completely inserted into the insertion hole 21 from the rear end portion of the insertion hole 21. After the sub-buckle 3 is completely inserted into the insertion hole 21, that is to say, crowding the insertion hole 21, the front end portion 22 of the middle buckle 2 can not be radial shrinkage, thereby the outer wall of the middle buckle 2 is matched with the inner wall of the female buckle 1, the middle buckle 2 is limited by the positioning ring 12 and can not take off from the female buckle 1, then the furniture panels is connected stably.

The rear end portion of the middle buckle 2 is provided with a boss 23 extended along its radial direction. The rear end portion of the sub-buckle 3 has step-shaped bottom panel 31, the front face of the bottom panel 31 is matched with the rear face of the boss 23.

The boss 23 mainly has location function, used for obviating the middle buckle 2 sliding forward along axial direction. During assembly, the back face of the second panel has a retaining nest matching with the boss 23, the front face of the boss 23 is corresponding with the bottom of the retaining nest, thereby the boss 23 is restricted by the bottom of the retaining nest, as a result the middle buckle 2 can not move forward, so increasing the operational reliability of the furniture connector in the invention. Similarly, the front face of the step-shaped bottom panel 31 of the sub-buckle 3 is matched with the back face of the boss 23, thereby the bottom panel 31 is restricted by the back face of the boss 23, as a result the sub-buckle 3 can not slide forward after assembling. Both of the boss 23 and the bottom panel 31 have location function.

Figure 11:
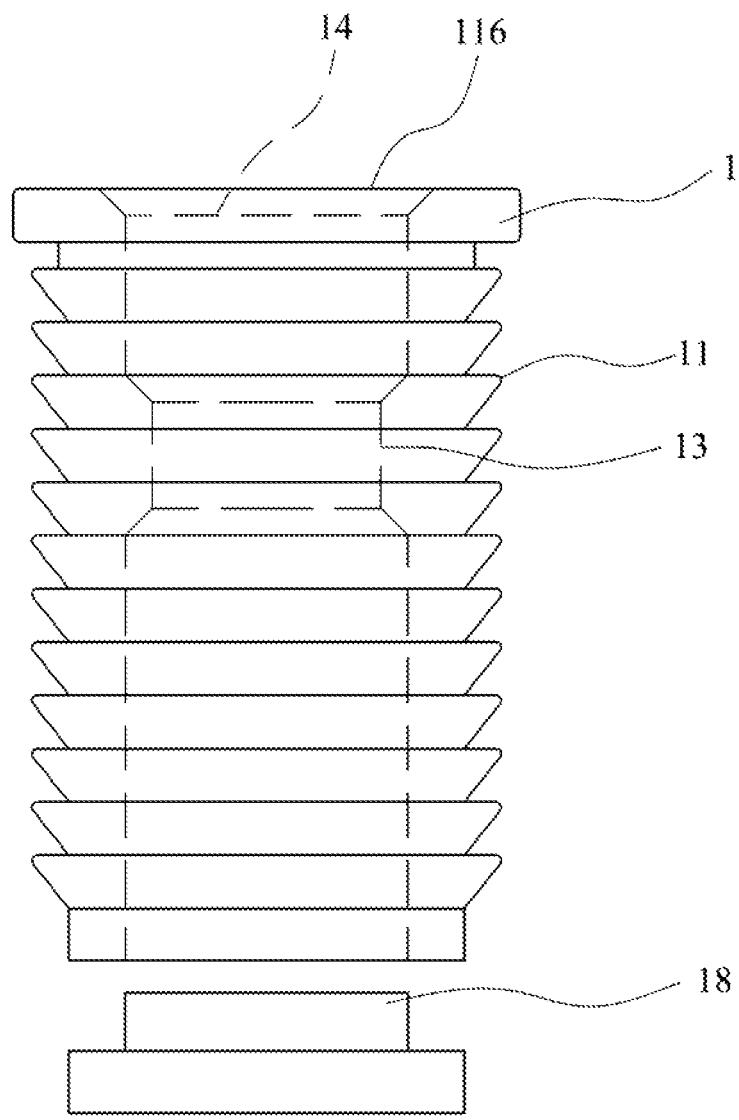
FIG. 11 is a perspective view of the female buckle of the combine panel according to the invention.

Referring FIG. 11, the side where the rear face of the female buckle 1 that lies in the side of the orifice 411 of the mounting hole 41 is flush with the surface of the first panel 4. The distance between the rear face 116 and the rear face of the middle buckle 2 is equal to the thickness of the second panel 5. Thus, when the first panel 4 and the second panel 5 is fastened by the insertion furniture connector, the first panel 4 and the second panel 5 are seamless connection.

Referring FIG. 9, on the second panel 5, there is provide with a recess cut 51 matching with the boss 23, used for holding the boss 23, thereby hiding the boss 23 and the bottom panel 31 in the panel.

Referring FIG. 10, when the second panel 5 is thinner, the distance between the rear face 116 and the boss 23 of the middle buckle 2 is equal to the thickness of the second panel 5, at this situation, the boss 23 lies on the surface of the second panel 5. The outer wall of the female buckle has pawls 11.

Referring FIG. 11, the female buckle1 is provided a sealing cover 18 to seal the buckle hole 14 on its inserting end portion where it is inserted into the bottom of the mounting hole 41.

Figure 12:
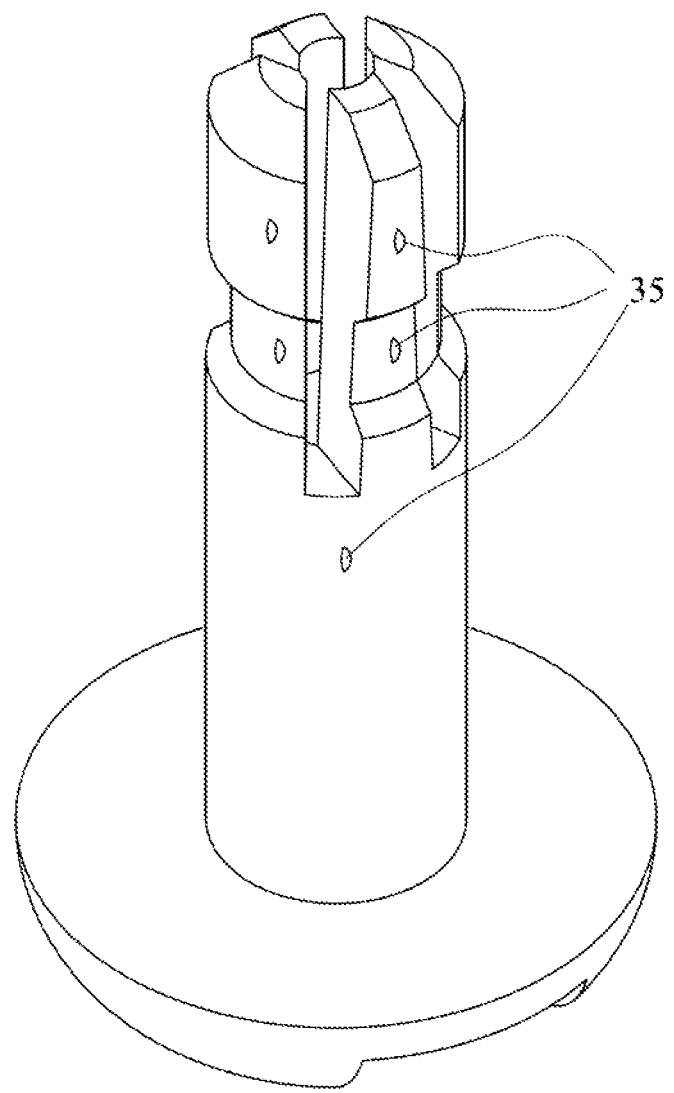
FIG. 12 is a perspective view of the middle buckle of the combine panel according to the invention.

Referring FIG. 12, the outer wall of the middle buckle 2 has protruding portions 35. The protruding portions 35 increases the friction between the middle buckle 2 and the female buckle 1 or the mounting hole, as a result the middle buckle 2 does not easily take off from the insertion hole 21.

Figure 13:
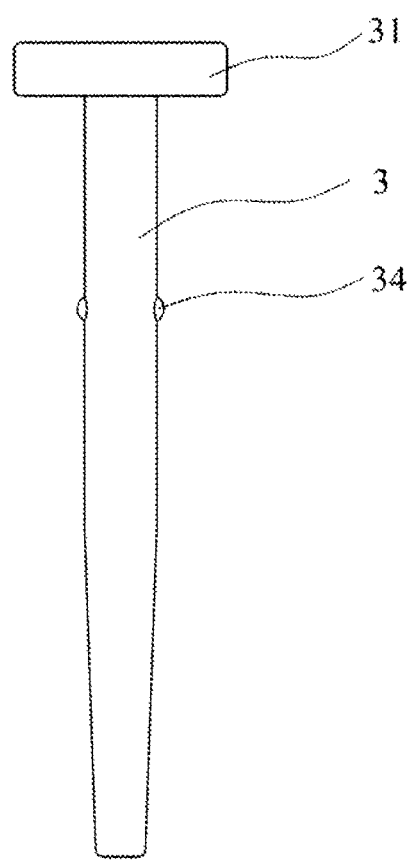
FIG. 13 is a perspective view of the sub-buckle of the combine panel according to the invention.

Referring FIG. 9, FIG. 10 and FIG. 13, on the outer wall of the sub-buckle 3, there is some bumps 34. After the sub-buckle 34 is inserted into the insertion hole 2 of the middle buckle 2, the bumps 34 increase the friction between the sub-buckle 3 and the inner wall of the insertion hole 21, as a result the sub-buckle 3 does not easily take off from the insertion hole 21.

Although the invention has been described with reference to the particular arrangement of parts. features and the like, these are not intended to exhaust all possible arrangements of features, and indeed many other modifications and variations will be ascertainable to those of skill in the art.

What is claimed is:
1. An insertion and extrusion type furniture connector, comprising:
  a female buckle;
  a middle buckle; and
  a sub-buckle,
  wherein said female buckle has a buckle hole with a central axis, whose wall is formed with a positioning ring;
  wherein said middle buckle is a hollow rod having an insertion hole in its axis direction, the rod wall of the front end portion of said middle buckle is provided with axis direction slits, and the front end portion of said middle buckle has an exterior rim engaged with said buckle hole;
  wherein said sub-buckle is a rod-shaped body which is inserted into the insertion hole and which has a diameter matching with that of the insertion hole;
  wherein said female buckle is cylinder-shaped, and the female buckle has a central axis perpendicular to that of said buckle hole and provides a plane perpendicular to the central axis of said buckle hole in the position of opposing said middle buckle; and wherein the top surface of said female buckle is a flat surface, where has a concave adjusting groove.

2. An insertion and extrusion type furniture connector according to claim 1, wherein the rear end portion of said middle buckle is provided with a boss extended along its radial direction.

3. An insertion and extrusion type furniture connector according to claim 2, wherein the rear end portion of said sub-buckle has step-shaped bottom panel, the front face of said bottom panel is matched with the rear face of said boss.

4. An insertion and extrusion type furniture connector according to claim 3, wherein the exterior rim of said boss has protective wall backward, and the height of said protective wall is no less than the thickness of said bottom panel.

5. An insertion and extrusion type furniture connector according to claim 4, wherein the front end portion of said middle buckle is provided with a guide part which is extended axially forward and has a gradually decreasing outer diameter.

6. An insertion and extrusion type furniture connector according to claim 5, wherein the front end portion of said sub-buckle is provided with a guide part which is extended axially forward and has a gradually decreasing diameter.

7. An insertion and extrusion type furniture connector according to claim 1, wherein the rear part of said sub-buckle is engraved with occlusal strias.

8. An insertion and extrusion type furniture connector according to claim 7, wherein the outer wall of said female buckle has pawls.

9. A panel assembly, comprising:
a first panel having a first mounting hole;
a second panel having a second mounting hole; and,
an insertion type furniture connector for connecting said first panel and said second panel;
wherein said insertion type furniture connector includes a female buckle, a middle buckle, and a sub-buckle, said female buckle is inserted into said first mounting hole of the said first panel, and said female buckle has a buckle hole, whose wall is formed with a positioning ring;
wherein said middle buckle is a hollow rod having an insertion hole in its axis direction, the rod wall of the front end portion of said middle buckle is provided with axis direction slits, the front end portion of said middle buckle runs through said second mounting hole of said second panel and enters into said buckle hole of said female buckle, and the front end portion of said middle buckle has an exterior rim engaged with the wall of said buckle hole having said positioning ring;
wherein said sub-buckle is a rod-shaped body, which is inserted into said insertion hole of said middle buckle, and which has a diameter matching with that of said insertion hole; and
wherein said female buckle is provided with a sealing cover to seal said buckle hole on its inserting end portion where it is inserted into the bottom of said mounting hole;
wherein the rear end portion of said middle buckle has a boss along its radial direction, said second panel has a recess cut on the side face where the rear end portion of said middle buckle lies, said boss is held in said recess cut;

wherein the side where the rear face of said female buckle lies in the side of the orifice of said mounting hole is flush with the surface of said first panel;

wherein the distance between the rear face of said female buckle and said boss of said middle buckle is equal to the thickness of said second panel.

10. A panel assembly according to claim 9, wherein the distance between the rear face of said female buckle and the rear face of said middle buckle is equal to the thickness of said second panel.

11. A panel assembly according to claim 9, wherein the outer wall of said sub-buckle, which part is inserted into said middle buckle, has a bump.

12. A panel assembly according to claim 9, wherein the outer wall of said middle buckle has a protruding portion.

13. A panel assembly according to claim 9, wherein the outer wall of said female buckle has pawls.

14. An insertion type furniture connector, comprising:
a female buckle;
a middle buckle; and
a sub-buckle,
wherein said female buckle is a hollow cylinder whose inner wall is formed with a positioning ring;
wherein said middle buckle is a hollow rod having an insertion hole in its axis direction, the rod wall of the front end portion of the middle buckle is provided with axis direction slits, and the exterior rim of the front end portion of the middle buckle engages with the inner wall of the female buckle having the positioning ring;
wherein said sub-buckle is a rod-shaped body which can be inserted into the insertion hole and which has a diameter matching with that of the insertion hole;
wherein the rear end portion of said middle buckle is provided with a boss extended along its radial direction;
wherein the rear end portion of said sub-buckle has step-shaped bottom panel, the front face of said bottom panel is matched with the rear face of said boss;
wherein the outer margin of said boss has protective wall backward, the height of said protective wall is not less than the thickness of said bottom panel; and
wherein the front end portion of said middle buckle is provided with a guide part which is extended axially forward and has a gradually decreasing outer diameter.

15. An insertion type furniture connector according to claim 14, wherein the front end portion of said sub-buckle is provided with a guide part which is extended axially forward and has a gradually decreasing diameter.

16. An insertion type furniture connector according to claim 15, wherein the outer wall of said female buckle has pawls.

17. An insertion type furniture connector according to claim 16, wherein the rear end portion of said female buckle has raised position-limit step along its axis.

18. An insertion type furniture connector according to claim 17, wherein the rear part of said sub-buckle is engraved with occlusal strias.

19. An insertion type furniture connector according to claim 18, wherein said positioning ring is convex towards the axis of said female buckle and is formed with convex annular shape, which has ladder-shaped sections with two beveled edges.

* * * * *